United States Patent [19]
Barrow

[11] Patent Number: 5,458,868
[45] Date of Patent: Oct. 17, 1995

[54] METHOD OF MAKING ANALOGUES OF β-ALUMINA

[75] Inventor: Peter Barrow, Alvasgton, England

[73] Assignee: Lilliwyte Societe Anonyme, Luxembourg, Luxembourg

[21] Appl. No.: 375,043

[22] Filed: Jan. 17, 1995

Related U.S. Application Data

[63] Continuation of Ser. No. 85,664, Jun. 29, 1993, abandoned, which is a continuation of Ser. No. 611,251, Nov. 19, 1990, abandoned.

[30] Foreign Application Priority Data

Nov. 9, 1989 [GB] United Kingdom .................. 8925289

[51] Int. Cl.$^6$ .................. C01F 7/00; C01F 7/04
[52] U.S. Cl. .................. 423/600; 429/193
[58] Field of Search .................. 423/600; 429/193

[56] References Cited

U.S. PATENT DOCUMENTS

| | | | |
|---|---|---|---|
| 4,210,707 | 7/1980 | Farrington | 429/193 |
| 4,664,849 | 5/1987 | Farrington et al. | 423/600 |
| 4,732,741 | 3/1988 | Duncan et al. | 423/600 |
| 4,946,664 | 8/1990 | Van Zyl et al. | 423/600 |

FOREIGN PATENT DOCUMENTS

| | | |
|---|---|---|
| 0001434 | 4/1979 | European Pat. Off. . |
| 0064226 | 11/1982 | European Pat. Off. . |
| 1550094 | 8/1979 | United Kingdom . |
| 1575231 | 9/1980 | United Kingdom . |
| 2175582 | 12/1986 | United Kingdom . |
| 2175582A | 12/1986 | United Kingdom . |

OTHER PUBLICATIONS

Allitsch, G. et al., "Production and characterization of polycrystalline isomorphs of (sodium, strontium) beta–aluminas.", 6001 *Chem. Abstr.* 110:234095b (1989) Jun. 26, No. 26, Columbus, Ohio, US.

*Primary Examiner*—Steven Bos
*Attorney, Agent, or Firm*—Arnold, White & Durkee

[57] ABSTRACT

The invention provides a method of making an analogue of β"-alumina, the analogue having a layered β"-alumina spinel-type structure in which ate least some of the Na ions in the layers of Na ions separated by layers of Al and O ions in said β"-alumina spinel-type structure are replaced by substitute metal cations. The substitute metal cations are mono-, d- and/or trivalent. The method comprises dispersing in a boehmite having a well developed and highly ordered crystal structure at least one oxide of the substitute metal cations or a precursor thereof to form a starting mixture, and heating the mixture to a conversion temperature at which it is converted to the analogue.

17 Claims, 7 Drawing Sheets

METHOD OF MAKING ANALOGUES OF β-ALUMINA

This application is a continuation of application Ser. No. 08/085,664, filed Jun. 29, 1993, now abandoned, which was a continuation of application Ser. No. 07/611,251 filed Nov. 19, 1990, now abandoned.

BACKGROUND OF THE INVENTION

THIS INVENTION relates to a method of making analogues of β"-alumina in which the Na ions in β"-alumina are at least partially replaced by other metal cations; to a method of making polycrystalline artifacts from such analogues; and to products produced by said method.

β"-alumina (ie sodium β"-alumina) is a sodium aluminate having an idealized chemical formula $Na_2O.5Al_2O_3$ with a layered structure in which the sodium ions are present in discrete layers separated from one another by layers comprising aluminium ions and oxygen ions, forming a spinel-type structure. In the analogues of β"-alumina produced in accordance with the present invention, at least some of the Na ions in said layers thereof are replaced by other cations.

β"-alumina can be made by dispersing in aluminium oxide ($Al_2O_3$) or a precursor thereof, sodium oxide ($Na_2O$ or soda) in finely divided particulate form to provide an intimate starting mixture, and heating the mixture to a conversion temperature at which at least part of the mixture is converted to β"-alumina. Optionally, particularly when it is intended to form a polycrystalline artifact from the β"-alumina by sintering the mixture to a sintering temperature, above the conversion temperature at which the conversion to β"-alumina takes place and at which sintering temperature the β"-alumina is unstable and can revert to β-alumina (whose idealized chemical formula is $Na_2O.11Al_2O_3$ and which has a similar layered spinel-type structure in which layers of Na ions are separated by layers comprising Al and O ions but which has a higher resistivity than β"-alumina), a spinel stabilizer or spinel-forming oxide such as $Li_2O$ or MgO (lithia or magnesia) can be admixed in the starting mixture, the spinel stabilizer acting to stabilize the β"-alumina at the sintering temperature and also thereafter, when the polycrystalline artifact is cooled.

When β"-alumina is formed by heating to the conversion temperature, and is then further heated in the absence of a spinel stabilizer or spinel-forming oxide, it passes through a transition temperature, above the conversion temperature, above which transition temperature the β"-alumina reverts to β-alumina.

Thus, by a 'spinel-forming oxide' or 'spinel stabilizer', examples of which are lithia and magnesia, is meant an oxide, which, when dispersed in β-alumina, promotes the stabilization therein of any β"-alumina above the transition temperature. Without the presence of a spinel stabilizer any β"-alumina typically reverts to β-alumina above the transition temperature, so that it is difficult or impossible, in the absence of a spinel stabilizer, to make a β"-alumina-containing sintered ceramic artifact by heating a β-alumina-containing powder compact to a sintering temperature which is above the transition temperature.

SUMMARY OF THE INVENTION

The Applicant has found, surprisingly, that analogues of β"-alumina in which at least some of the Na ions in the layers of Na ions can be replaced by substitute metal cations, which may be mono-, di- or trivalent, to provide β"-alumina analogues which are solid electrolyte conductors of said substitute metal ions and which, when containing a suitable spinel stabilizer or stabilizers, can be sintered into polycrystalline artifacts useful as solid electrolytes for conducting said substitute metal cations or indeed, after ion exchange with hydronium ions, for conducting hydronium ions, in electrochemical cells or fuel cells, in gas sensing devices or the like. To make these analogues at least a proportion of the sodium oxide or its precursor in the starting mixture is replaced by an oxide of the substitute metal cation or a precursor thereof, boehmite being used which has a well developed and highly ordered crystal structure, as a precursor for the aluminium oxide.

DETAILED DESCRIPTION OF THE INVENTION

Figure 1:
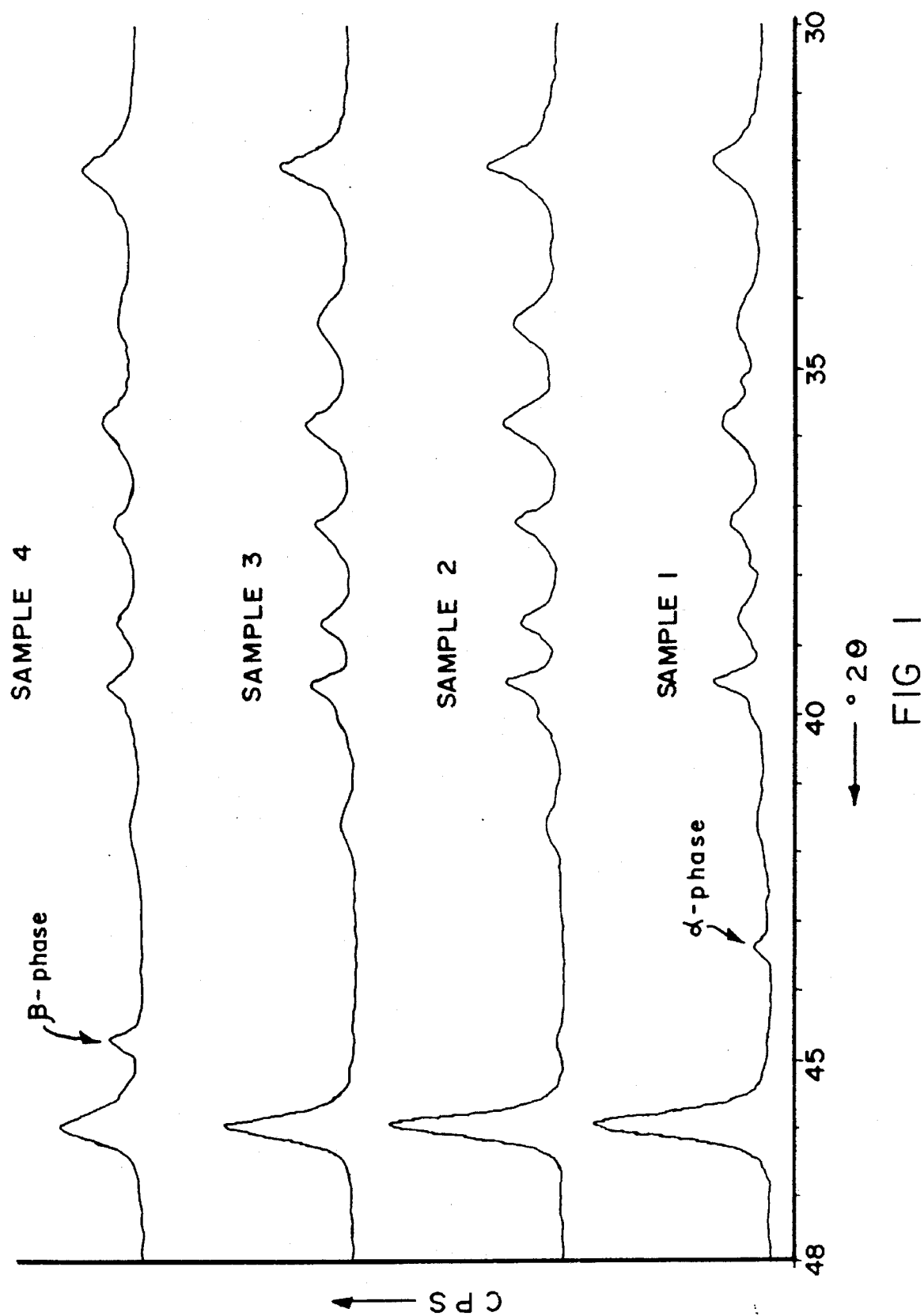
FIG. 1 shows plots of X-ray diffraction traces for samples 1–4 in counts per second (cps) against °2θ.

By 'precursor' as used herein, with regard to a metal oxide, is meant a compound which, when heated in air to 700° C. by itself, provides said metal oxide, any non-metals in the precursor being driven off from the metal oxide in gaseous reaction products of the reaction whereby the precursor is converted to the oxide. Suitable precursors include, for example, the hydroxides, carbonates and nitrates of the metals in question. By 'boehmite' is meant the orthorhombic form of alumina monohydrate (ie aluminium oxide monohydrate or $Al_2O_3.mH_2O$ in which m is from 1 to 1,3) whose crystal lattice structure has a symmetry which is defined by the space group $D^{17}$.

Accordingly, the present invention provides a method of making an analogue of β"-alumina, the analogue having a layered β"-alumina spinel-type structure in which at least some of the Na ions in the layers of Na ions separated by layers of Al and O ions in said β"-alumina spinel-type structure are replaced by substitute metal cations selected from metal cations which are monovalent, divalent, trivalent and mixtures thereof, the method comprising the steps of:

dispersing, in a boehmite having a well developed and highly ordered crystal structure as defined herein, at least one oxide of said substitute metal cations or a precursor thereof, to form a starting mixture; and heating the starting mixture to a conversion temperature at which at least some of the starting mixture is converted to said analogue.

By 'a boehmite having a well developed and highly ordered crystal structure as defined herein' is meant a boehmite having an average crystallite size as determined by X-ray line broadening and scanning electron microscopy of at least 100 Å, an average basal plane spacing as determined by X-ray diffraction of at most 6,8 Å, and a mass loss on heating at 10° C./min in air from 20°–700° C. of at most 20% by mass with the maximum rate of mass loss occurring at a temperature of at least 400° C.

Preferably the boehmite has a said average crystallite size of at least 1000 Å (more preferably at least 8000 Å), a said basal plane spacing of at most 6,5 Å and a said mass loss upon heating of at most 17%, said maximum rate of mass loss occurring at a temperature of at least 500° C., the boehmite having a formula which can be expressed by $Al_2O_3.mH_2O$ in which m is at most 1,05 and being hydrothermally prepared. Preferably the boehmite has a formula $Al_2O_3.mH_2O$ in which m is 1, ie $Al_2O_3.H_2O$ or $AlOOH$; and it is preferably hydrothermally prepared. By 'hydrothermally prepared' is meant that the boehmite was prepared by the hydrothermal conversion thereto of alumina trihydrate (aluminium oxide trihydrate) which had been made by the Bayer Process, the hydrothermal conversion taking place in water or in a dilute alkaline aqueous solution at a temperature of 150°–300° C. The Bayer Process is described in The Condensed Chemical Dictionary, 9th Edition, as revised by Gessner G Hawley, Van Norstrand Reinhold Co., 1977 at page 94. The hydrothermal conversion of alumina trihydrate to boehmite is described by Hüttig et al in an article entitled "Information on the System $Al_2O_3.H_2O$ in Z. Anorg. Allg. Chem., 171, 232–243 (1928).

In particular the boehmite may be that available in Great Britain under the Trade Mark 'CERA HYDRATE', from BA Chemicals Plc, Gerrards Cross, Buckinghamshire, England. Cera Hydrate boehmite is hydrothermally prepared and complies with the preferred parameters set forth above for average crystalline size, average basal plane spacing, mass loss on heating and maximum rate of mass loss. Indeed Cera Hydrate boehmite as sold by BA Chemicals Plc has a specific surface area ($m^2/g$) of less than $5m^2/g$ as determined by Brunauer, Emmett and Teller (BET) nitrogen absorption, it has an average crystallite size of 10,000–50,000 Å, e.g. 10,000–20,000 Å, as determined by scanning electron microscopy, and it undergoes the major part of its dehydration when heated at 10° C./min from 20° to 700° C. at temperatures of 470°–550° C. In this regard it should be noted that boehmite having a theoretically ideal pure crystal structure will have a basal plane spacing of about 6,11 Å, a mass loss on heating at 10° C./min from 20° to 700° C. of about 15% by mass, and its maximum rate of mass loss (the point of inflexion on its thermogrametric analysis (TGA) curve) when so heated will be at about 540° C.

The Applicant has found that whether or not a boehmite has a suitably well developed and highly ordered crystal structure for use in accordance with the method of the present invention, can be determined from an analysis of the X-ray diffraction trace thereof, when subjected to X-ray diffraction after calcining by heating by itself in air. How to obtain such traces and analyse them are described exhaustively in British Patent 2 175 582, which description in British Patent 2 175 582 is thus incorporated herein by reference. Preferably the boehmite used for the present invention, after calcining, has values for A/S and B/S as defined in British Patent 2 175 582, which are respectively greater than 0.03 and 0.04, the A/S and B/S values both being preferably being greater than 0.05 and more preferably being respectively greater than 0.09 and 0.07.

As indicated above, large crystallite sizes in the boehmite favour a high proportion of the desired analogue in the product, which high proportion is also favoured by low specific surface areas in the boehmite and low mass loss by dehydroxylation on heating which takes place at high temperatures; and these characteristics appear to be associated with high values for A/S and B/S. Crystallite sizes of 1,000 Å and 8,000 Å appear to correspond respectively with specific surface areas of about $10m^2/g$ and about $5m^2/g$.

As indicated above, the method can merely be employed to form analogues of $\beta''$-alumina, e.g. in powder form, or it can be employed to form polycrystalline densified sintered artifacts containing said analogues, depending on the maximum temperature of the heating. While the use of spinel stabilizers is unnecessary if there is no heating to above the transition temperature, e.g. when a powder product rather than a sintered artifact is required, it can be desirable to employ a spinel stabilizer when such artifact is to be made, to resist reversion or decomposition, above their transition temperatures, of the analogues of $\beta''$-alumina to analogues of $\beta$-alumina, during firing up to temperatures required to form fully densified ceramic artifacts, if these temperatures are above the transition temperatures of the analogues in question.

The method of the invention may thus comprise the step of, before the heating to the conversion temperature, dispersing uniformly in the starting mixture a suitable proportion of a spinel stabilizer, e.g. magnesia or lithia, or a precursor thereof. This spinel stabilizer, or precursor thereof, and any soda dispersed into the starting mixture, are conveniently dispersed therein together with the substitute metal oxide or precursor thereof, and any such dispersion should preferably take place before the boehmite is heated to its conversion temperature. Thus, as described for the manufacture of $\beta''$-alumina in British Patent 2 175 582, the boehmite may be calcined before said dispersion by heating it to a temperature, below the conversion temperature, in air, to dehydrate it, 700° C. being a convenient temperature for this heating and the heating rate being variable within wide limits, as convenient, 10° C./min being a suitable value. The spinel stabilizer may be used in proportions such that the starting mixture, after heating to the conversion temperature, contains 0,05–4,0% by mass spinel stabilizer. When the spinel stabilizer is lithia, said proportion may be 0,05–1%, preferably 0,2–0,8%; and when it is magnesia, said proportion may be 0,25–5%, preferably 2,5–4%. Other spinel stabilizers can be used, generally in similar proportions; and mixtures of spinel stabilizers can be used, acceptable proportions being established by routine experimentation. Thus, for example, for stabilizing $\beta''$-alumina, 0,75% by mass lithia has been found to be equivalent to about 4% by mass magnesia, based on the mass $\beta''$-alumina produced.

Dispersing the starting materials in one another to form the starting mixture may be by milling, e.g. wet milling, until the mixture has a particle size of at most 30 µ, preferably until at least 80% by mass of the mixture is at most 55,000 Å in size. The milling may be by wet milling in the presence of water with a vibro-energy mill, e.g. for 2–10 hours or more. In this case the spinel stabilizer, the oxide of the substitute cations and any soda admixed into the boehmite, are conveniently added as an aqueous solution of a soluble hydroxide or salt such as a carbonate or nitrate. After the wet milling the aqueous starting mixture may be spray dried to obtain a powder having a mixture content of e.g. 2–10% by mass. Instead, a gel can be formed of the starting mixture as described in British Patent 2 175 582, which, after milling, is dried to 2–10% by mass moisture and ground to obtain a similar powder.

Heating may be according to a regime wherein the temperature of the boehmite is increased progressively to the maximum temperature to which it is heated, without any intermediate temperature peaks or plateaus. Thus, the heating may be according to a heating regime whereby the temperature of the mixture is progressively and continuously increased to a maximum temperature, and is thereafter cooled according to a cooling regime whereby the temperature of the heated product is progressively and continuously cooled to ambient temperature. The maximum temperature may be held for a predetermined soaking period, after which said cooling takes place, and the heating of the mixture may be to a maximum temperature of at least 1000° C.

When the method is used merely to form an analogue of β"-alumina, heating will be to a temperature lower than that required to form a sintered artifact, which will typically be as fully densified as possible, unitary or integral, and self-supporting. Thus, for artifact manufacture, heating of the starting mixture may be to a maximum or sintering temperature, typically above 1200° C., sufficient to form a unitary self-supporting mass from the mixture. When an artifact is to be made, the mixture may be formed in a green state into an artifact, prior to the heating of the mixture. The mixture in dry powder form, containing less than 10% m/m moisture, may be formed into the artifact by pressing to a pressure of 5,000–100,000 psi (1 psi+6,894757×10³ Pa). The pressing may be isostatic pressing and may be to a pressure of 30,000–60,000 psi. However, while isostatic pressing to a pressure of typically above 30,000 psi will usually be employed, on dry powders obtained e.g. from spray drying, uniaxial pressing or die pressing of the dried powder may instead be employed. Milling of the constituents to mix them will thus typically be to form a slip having a solids content of about 50% m/m, suitable for spray drying, followed by spray drying to about 2–10% m/m moisture.

For making an artifact, heating the mixture may be to a maximum temperature of 1550°–1700° C., typically 1600°–1630° C. and preferably 1610°–1620° C. The rate of heating of the mixture may be between 150° and 300° C./hr from a temperature of at least 550° C. up to a temperature not closer than 100° C. to said maximum temperature, and then at a rate of at most 100° C./hr until the maximum temperature has been reached. The rate of heating of the mixture from ambient temperature up to said temperature of at least 550° C. is preferably at most 100° C./hr. The initial low rate of heating is to reduce any tendency to crack upon dehydration, and the final low rate is to promote densification of the artifact.

The average rate of heating the mixture from ambient temperature up to maximum temperature will thus typically be at most 300° C./hr, if raw boehmite is used. However, if calcined boehmite is used, heating can be at 300° C./hr or more from ambient, with a suitable slowing of the heating rate, if necessary, as the maximum temperature is approached.

The mixture which is heated may thus have its temperature increased at a relatively low average rate of less than 100° C./hr, e.g. 60° C./hr, according to normal ceramic practice, until all the free water, bound water and any other volatiles have been driven off at a temperature of say 550°–650° C., after which the rate of temperature increases may be raised to said value of 150°–300° C./hr until shortly before the maximum temperature is reached (but not closer than 100° C. to said maximum temperature), after which the rate is decreased to a relatively low rate of less than 100° C./hr, e.g. 60° C./hr. The initially low rate of temperature rise is to resist any cracking or physical damage to the artifact, the final low rate of heating being to promote densification and to promote an even temperature profile throughout the heated artifact.

The lower limit of the maximum temperature is set by factors such as an acceptable electrical resistivity in the final artifact, for example for use as a solid electrolyte or separator in an electrochemical cell, and sufficient sintering and strength in the final artifact. Below about 1600° C. maximum temperature the electrical resistivity in the final product will be increased and in particular the strength of the artifact may be unacceptably low, for example for use as a solid electrolyte or separator in an electrochemical cell.

When it is not intended to produce an artifact, but merely a powder or particulate material containing analogues of β"-alumina, the initial low rate of temperature increase can be dispensed with, as can the final relatively low rate of temperature increase, and the maximum temperature can naturally be lower.

When heating is merely to form the product in powder or particulate form, the maximum temperature may be substantially lower, e.g. about 1200° C. or possibly somewhat less. In this case the maximum temperature will be selected by a trade off between the amount of analogues of β"-alumina produced, and factors such as power consumption, materials of construction necessary for the furnace, etc. Spinel-stabilizers will generally be employed for artifact manufacture, and they will also be used, possibly in reduced proportions, when the product is produced as a flowable partially processed material intended to be stored for an indeterminate period for eventual use in artifact manufacture.

A typical heating regime which has been used for artifact manufacturing involves heating a starting mixture, at a rate of 60° C./hr from ambient temperature up to 600° C., then at 200° C./hr from 600° C. up to 1400° C., and then at 100° C./hr up to about 15° C. below the maximum temperature, the final rate being at about 60° C./hr for the last 15 minutes or so. The changes from 200° C./hr to 100° C./hr at 1400° C. and from 100° C./hr to 60° C./hr at about 15° C. below the maximum temperature were dictated by the characteristics of the furnace used, and had the furnace been capable of maintaining a rate of 200° C./hr until the maximum temperature was reached, there would have been no change from 200° C./hr to 100° C./hr at 1400° C., or to 60° C./hr at 15° C. below the maximum temperature. Thus, if calcined boehmite is used, the heating can be at 200° C.–300° C./hr or possibly higher, from ambient directly to the maximum temperature, if the furnace permits this.

Heating may be in a furnace, e.g. an electric furnace or possibly a gas-fired furnace, heated up with the sample contained therein from ambient temperature to the maximum ambient temperature, or it may be in a furnace maintained at the maximum temperature and through which the sample is moved at an appropriate rate, in which case the furnace may be electric.

Various metal ions can at least potentially be employed, depending on their ionic radii, as substitutes for sodium ions in the analogues of β"-alumina made by the method of the present invention. Thus, the substitute metal cations may be selected from the group consisting of:

Li, K, Rb, Cs and Fr from Group I of the periodic table of elements;

Be, Mg, Ca, Sr, Ba and Ra from Group II of the periodic table;

Ga, In and Tl from Group III;

Ge, Sn and Pb from Group IV;

As, Sb and Bi from Group V;

Se, Te and Po from Group VI;

the elements with atomic numbers of 21–30 inclusive, ie Sc—Zn, from the 1st series of transition elements in the periodic table;

the elements with atomic numbers of 39–48 inclusive, ie Y—Cd, from the 2nd series of transition elements;

those with atomic numbers of 72–80 inclusive, ie Hf—Hg, from the 3rd series of transition elements;

all the lanthanides from the periodic table, being the elements with atomic numbers 57–71 inclusive, ie La—Lu; and all the actinides from the periodic table, being the elements with atomic numbers of 89–103 inclusive, ie Ac—Lw.

Generally, those substitute cations with an ionic radius close to that of the sodium cation are expected to be more promising substitutes than those whose ionic radii are less similar to that of sodium. Furthermore the proportion in which the substitute cation is used can affect its utility, so that it is a better substitute at some proportions than at others.

Oxides of these metals or their precursors can be used alone as substitutes, or as mixtures; and they can be used in admixtures containing soda or precursors of soda or with no soda.

Accordingly the substitute metal cations may be those of a plurality of metals, a plurality of said substitute metal cation oxides or precursors thereof being dispersed in the boehmite to form the starting mixture. Soda or a precursor thereof may be dispersed in the boehmite together with said at least one oxide of said substitute metal cations or precursor thereof, to form the starting mixture; or, instead, said at least one oxide of said substitute metal cations may be dispersed, without any soda, in the boehmite.

When soda or a precursor thereof has been used in the past, alone and without any substitutes, to make $\beta''$-alumina having the abovedescribed spinel-type structure with layers of sodium ions separated from one another by layers comprising aluminium ions and oxygen ions, it has been found that a proportion of starting materials equivalent to a $Na_2O:Al_2O_3$ mole ratio in the starting mixture of 1:5,475–1:10 is required to obtain a product comprising at least 95% by mass $\beta''$-alumina after heating to the conversion temperature. In mass terms this range of mole ratios amounts to about 1:9–1:16,45 or about 5,7–10% by mass soda in the product. Usually about 7–10% by mass soda is employed, an example being 9%.

When a monovalent substitute such as potassium is used to replace the sodium, the proportions of starting materials should similarly be selected so that the mole ratio of the oxide of the substitute or its precursor to the boehmite, expressed in terms of the $X_2O:Al_2O_3$ mole ratio where X is the substitute monovalent cation, is likewise 1:5,475–1:10. In this range of mole ratios the X-analogues of $\beta''$-alumina, in which X cations replace the sodium cations in said layers, can be obtained. The Applicant has found that, at $X_2O:Al_2O_3$ mole ratios of 1:5,475–1:8, it is usually necessary to employ a spinel stabilizer as described above such as $Li_2O$ or $Mg_2O$, in mass proportions up to those described above, in order to retain the spinel-type structure of the analogues above the transition temperature, and at sintering temperatures of up to 1600° C. or more. Surprisingly, however, the Applicant has found that, when a boehmite with a well developed and highly ordered crystal structure is used in accordance with the method of the invention, and when using proportions of starting materials which can be expressed by an $X_2O:Al_2O_3$ mole ratio of 1:8–1:10, no spinel stabilizer whatsoever is apparently required to stabilize the spinel-type structure at temperatures of up to 1600° C. This is true in particular when using potassium as the substitute X ion, and using Cera Hydrate boehmite.

When a divalent substitute such as barium is used to replace the sodium, the proportions of starting materials should be selected so that the mole ratio of the oxide of the substitute or its precursor to the boehmite, expressed in terms of the $YO:Al_2O_3$ mole ratio where Y is the substitute divalent cation, is 1:2,875–1:10. Once again, the Applicant has surprisingly found that, when the $YO:Al_2O_3$ mole ratio is 1:8–1:10, no spinel stabilizer is required, partially when Y is Ba. When this mole ratio is 1:5–1:8 spinel stabilizers such as those described above, including $Li_2O$ and MgO, may typically be employed, in mass proportions up to those described above; and when said mole ratio of $YO:Al_2O_3$ is 1:2,875–1:5, a spinel stabilizer may be used in the form of a metal oxide or precursor thereof having a tetravalent cation which valency is 4+ such as $Ti^{4+}$ or $Zr^{4+}$, in this case the stabilizer being used as the oxide also in mass proportions up to those described above for $Li_2O$ or MgO when used to stabilize $\beta''$-alumina.

Turning to trivalent metal cation substitutes such as La, the proportions of starting materials should be selected so that the mole ratio of the oxide of the substitute or its precursor to the boehmite, expressed in terms of the $Z_2O_3:Al_2O_3$ mole ratio where Z is the trivalent substitute cation, is 1:5,475–1:30. Again, when the $Z_2O_3:Al_2O_3$ mole ratio is 1:8–1:10, no spinel stabilizer appears to be necessary; but when this ratio is 1:5,475–1:8, stabilizer of the type such as $Li_2O$ or MgO used to stabilize $\beta''$-alumina may be used, in mass proportions up to those described above; and for $Z_2O_3:Al_2O_3$ mole ratios of 1:10–1:30 a metal oxide stabilizer or precursor thereof having a tetravalent metal cation such as $Ti^{4+}$ or $Zr^{4+}$ may again be used, as the oxide, in mass proportions up to those described above for $\beta''$-alumina stabilizers such as $Li_2O$ or MgO.

In other words, depending on the valency of the substitute metal cations, the mole ratio of said at least one substitute metal cation oxide or its precursor, together with any soda or precursor thereof dispersed in the boehmite, to the boehmite, may be 1:2,875–1:30. When the substitute metal cations are monovalent, said mole ratio is preferably 1:5,575–1:10; when they are divalent, said mole ratio is preferably 1:2,875–1:10; and when they are trivalent, said mole ratio is preferably 1:5,575–1:30. When the substitute metal cations are divalent or trivalent and the heating is to a temperature above a transition temperature at which the analogue of $\beta''$-alumina can revert to an analogue of $\beta$-alumina, the method may include dispersing in the boehmite, prior to the heating to the conversion temperature, a spinel stabilizer which is an oxide of a tetravalent metal cation or a precursor of said oxide. For each case a generally preferred mole ratio is 1:8–1:10; and, typically, the substitute metal cations may comprise a single species of cations.

In a particular embodiment of the invention, the substitute metal cations comprise potassium cations as the only substitute cations, used alone or with a soda dispersed in the boehmite. In this case the mole ratio of $K_2O$ or its precursor, as $K_2O$, together with any soda or precursor thereof, as $Na_2O$, to the boehmite, is conveniently 1:5–1:13, preferably 1:7–1:10; and the method may include, in this case, dispersing in the boehmite, prior to the heating to the conversion temperature, magnesia as a spinel stabilizer, in a proportion of up to 5% by mass, e.g. 0,25–4% by mass.

Naturally, routine experimentation, within the limits of the above proportions for the substitute metal oxides or their precursors, and stabilizers or their precursors, will be employed to determine optimum or at least adequate proportions of starting materials, for obtaining desired proportions, in the product after conversion, of the analogue of β"-alumina in question. Furthermore, oxides of the substitute metals or precursors of these oxides, while they will often be used alone, can be used as admixtures, or admixed with soda or a precursor thereof. When such mixtures of oxides of substitute metal cations, or mixtures thereof with soda, are employed with any particular mass or mole ratio between the constituents thereof, the molar proportion of the mixture to be dispersed in the boehmite in the starting mixture to be heated, can be calculated, based on the aforegoing values, bearing in mind the valency of the substitute metal or metals employed, and these calculations can be confirmed and/or optimized by routine experimentation.

When the product of the method is intended as a solid electrolyte of a particular substitute metal ion, such as potassium, barium or lanthanum, then, generally, all the sodium in β"-alumina, or at least as much as possible, of the sodium in β"-alumina, will be replaced by the analogue metal, and no sodium will be used in the starting mixture, unless a proportion thereof is required to obtain the desired spinel-type structure. However, when a mixture of metals is proposed for providing a solid electrolyte having several species of metal cations in the layer normally occupied by sodium ions in the spinel structure of β"-alumina, to provide an analogue of β"-alumina which can conduct several cation species, then the relative proportions of these cations will be selected accordingly.

Uses to which the ceramic metals of the present invention can be put include separators or solid electrolytes in electrochemical cells for conducting cations other than sodium from the anodes of such electrochemical cells during discharging thereof, or for conducting several cation species from said anodes. Said metallic substitute cations can be replaced by hydronium ions by ion exchange to provide solid electrolytes for use in fuel cells for conducting hydronium cations; and the ceramics can be used in gas sensing devices for sensing the presence and/or proportion of e.g. oxides of nitrogen and/or oxides of sulphur ($NO_x$ or $SO_x$) in vehicle exhausts, said oxide gases being sorbed by or acting otherwise to poison the ceramics to increase their resistivity; etc.

For enhanced stability of the β"-phase, particularly when potassium metal cations are the substitute metal cations, the Applicant has employed the method step, prior to forming the starting mixture, of calcining the boehmite by heating it in air to a temperature of above 650° C. and below the conversion temperature, e.g. 650°–750° C. and conveniently about 700° C.

The invention extends to analogues of β"-alumina, the analogues having a layered β"-alumina spinel type structure in which at least some of the Na ions in the layers of Na ions separated by layers of Al and O ions in said β"-alumina spinel-type structure are replaced by substitute metal cations selected from metal cations which are monovalent, divalent, trivalent and mixtures thereof, whenever made according to the method described herein.

The Applicant has had promising results in the production of the potassium analogue of β"-alumina, in which the sodium ions of β"-alumina (ie sodium β"-alumina) are replaced by potassium ions, using Cera Hydrate boehmite as the starting material. Thus, the Applicant has been able, using magnesia as spinel stabilizer, or, surprisingly, using no spinel stabilizer at all, to produce the potassium analogue of β"-alumina, referred to hereinafter as potassium β"-alumina, with starting mixtures in which the mole ratio of $K_2O$ or its precursor (as $K_2O$) to the boehmite was in the range 1:5–1:13. On the other hand, the use of lithia as spinel stabilizer did not appear materially to assist in the production of potassium β"-alumina. With $K_2O$:boehmite mole ratios of 1:7–1:10 it has been possible to obtain substantially single-phase potassium β"-alumina by heating to 1600° C.

The invention will now be described by way of non-limiting illustrative example, with reference to the following Examples and accompanying drawings, which shows plots of X-ray diffraction traces in counts/sec (cps) against °2θ.

EXAMPLES

In each of the Examples a starting mixture of Cera Hydrate boehmite and laboratory grade potassium hydroxide was used, to make potassium β"-alumina. In each case the Cera Hydrate boehmite was, before mixing with the potassium hydroxide, calcined by heating in air to 700° C. to cause dehydration thereof, in a Carbolite TOP HAT furnace. The nominal firing schedule according to the furnace setting was ambient-200° C. at 3° C./min; 200°–660° C. at 2° C./min; 660° C.–60 minute hold; 660° C.–700° C. at 2° C./min; and 700° C.-ambient at the natural cooling rate of furnace. This ensured that the whole furnace charge (about 130 kg) reached at least 700° C. During water loss from the boehmite 0,5–1 l/min of nitrogen was passed through the furnace to sweep water therefrom. In each case heating of the mixture to make the potassium β"-alumina took place in the above furnace in air according to the various heating schedules, and in magnesium crucibles with lids, unless otherwise specified.

Products were in each case sintered discs, although not necessarily of full (theoretical) density, and were analysed using a Phillips 1824 X-ray diffractometer using $Cuk_\alpha$ radiation to determine the phases present. Unless otherwise specified, the mixing of the boehmite and the potassium hydroxide was by wet milling for 2 hours in a 750 ml polypropylene jar using 10 mm diameter zirconia rods as grinding media, to form a slip of about 50% moisture content by mass, with an average particle size of 8–12 μ. The milling was followed by drying (oven drying for 2 hrs at 120° C. in nickel trays or spray drying) to a moisture content of 2–10%.

EXAMPLE 1

Four samples comprising boehmite/potassium hydroxide mixtures with no spinel stabilizer were formed and, after oven drying to constant mass at 120° C., were heated to 1240° C. at 4° C./min and held at that temperature for 30 minutes and allowed to cool at 5° C./min, followed by X-ray diffraction analysis thereof. Details of the mixtures are set forth in Table 1, with the potassium hydroxide being expressed as $K_2O$ and the boehmite as $Al_2O_3$.

TABLE 1

| Sample No | % by weight | | mole ratio |
| | $K_2O$ | $Al_2O_3$ | $K_2O$:$Al_2O_3$ |
|---|---|---|---|
| 1 | 6.80 | 93.2 | 1:12.7 |
| 2 | 8.83 | 91.17 | 1:9.5 |
| 3 | 10.90 | 91.10 | 1:7.5 |
| 4 | 15.39 | 84.61 | 1:5.1 |

The X-ray diffraction traces of the products produced are set forth in FIG. 1.

From FIG. 1 it is apparent that Samples 2 and 3 led to the production of single-phase products comprising at least 95% by mass potassium β"-alumina. On the other hand, Sample 1 led to the production of a multiphase mixture comprising both potassium β"-alumina and α-alumina, while Sample 4 led to the production of a multiphase product comprising potassium β"-alumina and potassium β-alumina.

Figure 2:
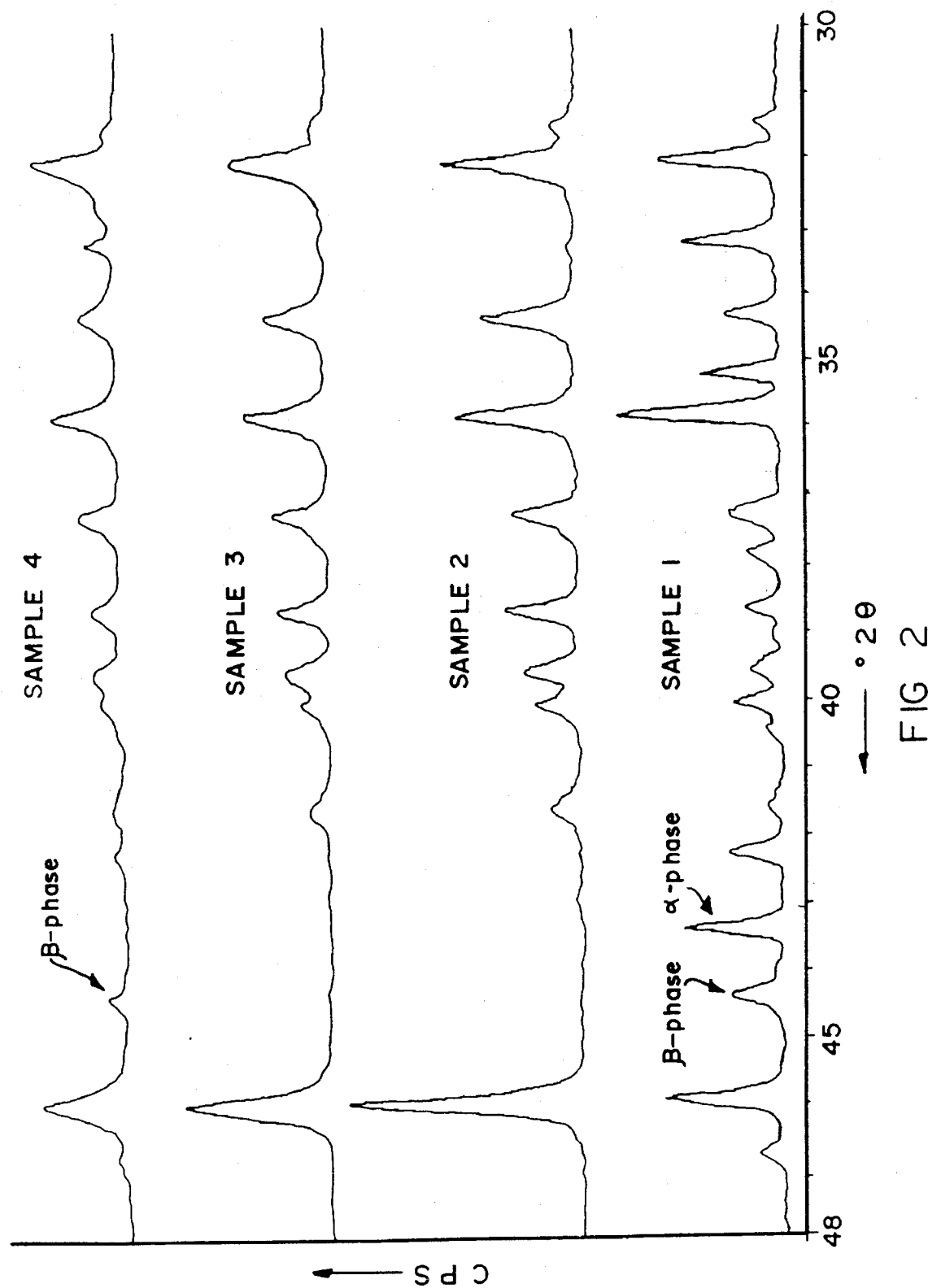
FIG. 2 shows plots of X-ray diffraction traces for samples 1–4 with additional heating to 1600° C. in counts per second (cps) against °2θ.

Four fresh samples of the same compositions as Samples 1–4 were then heated to 1600° C. and held at that temperature, after which they were allowed to cool, followed by further X-ray diffraction analysis, results being shown in FIG. 2. The heating schedule used was ambient-1240° C. at 4° C./min; 1240°–1590° C. at 2,3° C./min; 1590°–1600° C. at 1° C./min with a 30 minute hold at 1600° C.; 1600° C.–1500° C. at 15° C./min and 1500° C.-ambient at 7,5° C./min. From FIG. 2 it emerges that Samples 2 and 3 remained essentially unchanged, while Sample 1 shows the presence of potassium β"-alumina in addition to the potassium β-alumina and α-alumina obtained at 1240° C., and Sample 4 shows a reduced potassium alumina content relative to the product obtained at 1240° C.

This Example demonstrates that, at least for $K_2O$:boehmite ratios of 1:7–1:10, substantially single-phase products comprising potassium β"-alumina are obtainable without the use of a spinel stabilizer, and potassium β"-alumina can be obtained, mixed with other phases, at ratios outside these limits.

EXAMPLE 2

Example 1 was repeated for a further Sample having the composition set forth in Table 2.

TABLE 2

Figure 3:
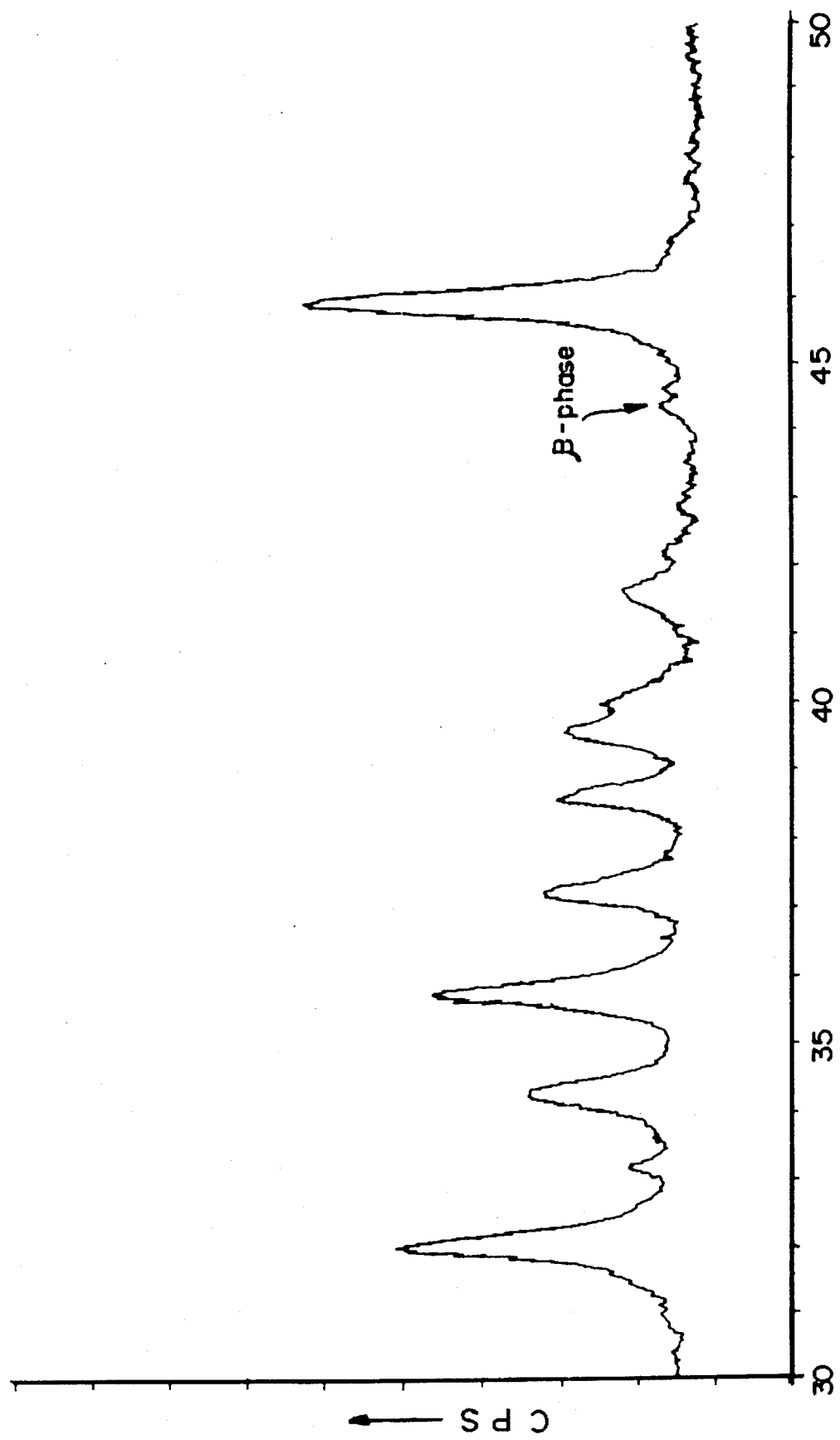
FIG. 3 shows plots of X-ray diffraction traces for the sample of Example 2 in counts per second (cps) against °2θ.

| Sample No | % by weight | | mole ratio |
|---|---|---|---|
| | $K_2O$ | $Al_2O_3$ | $K_2O:Al_2O_3$ |
| 5 | 12.11 | 87.89 | 1:6.7 | except that propan-2-ol in the same proportion by mass replaced the water in the wet milling and the heating schedule used was ambient-1400° C. at 3° C./min; 1400°–1590° C. at 1,7° C./min; 1590°–1600° C. at 1° C./min with a 6 minute hold at 1600° C.; 1600°–1500° C. at 15° C./min; and 1500° C.-ambient at 7,5° C./min. The product was allowed to cool and subjected to X-ray diffraction analysis, results being shown in FIG. 3, from which it appears that the product is a multiphase product comprising potassium β"-alumina and potassium β-alumina.

This Example indicates that $K_2O$:boehmite mole ratios of less than 1:7 are unsuitable, without any spinel stabilizer, for making a single-phase product by heating to 1600° C.

EXAMPLE 3

Example 1 was repeated for a further three samples, with the addition of lithia as a potential stabilizer and with varying proportions in the starting mixtures. The firing schedule used was ambient-1240° C. at 4° C./min; 1240°–1590° C. at 2,3° C./min; 1590°–1600° C. at 1° C./min with a 30 minute hold at 1600° C.; 1600°–1500° C. at 15° C./min; and 1500° C.-ambient at 7,5° C./min. Details of the mixtures are set forth in Table 3, as follows:

TABLE 3

| Sample | % by weight | | | mole ratio |
|---|---|---|---|---|
| | $K_2O$ | $Li_2O$ | $Al_2O_3$ | $K2O:Al_2O_3:Li_2O$ |
| 6 | 8.67 | 0.2 | 91.12 | 1:9.7:0.08 |
| 7 | 9.18 | 0.42 | 90.4 | 1:9.1:0.14 |
| 8 | 9.24 | 0.78 | 89.98 | 1:9.0:0.27 |

Figure 4:
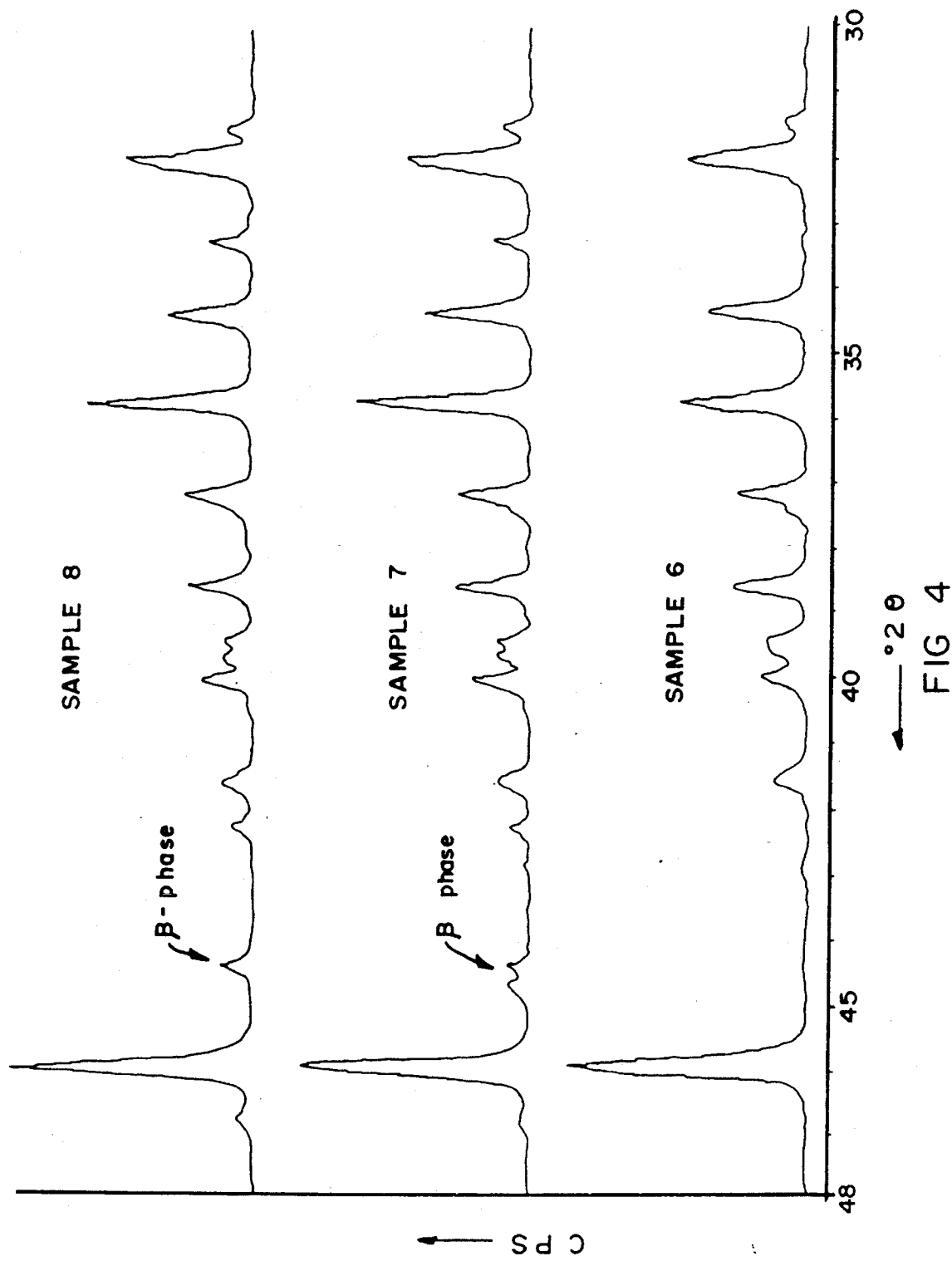
FIG. 4 shows plots of X-ray diffraction traces for samples 6–8 in counts per second (cps) against °2θ.

X-ray diffraction traces of the products produced are set out in FIG. 4, from which it is apparent that only Sample 6 was a single-phase potassium β"-alumina product, Samples 7 and 8 producing multiphase products comprising potassium β"-alumina and potassium β-alumina.

This Example indicated that there is no particular advantage to be gained from using lithia as a stabilizer, and it can indeed be counterproductive except at low levels of $K_2O$ and $Li_2O$ addition.

EXAMPLE 4

Example 2 was repeated for a further three samples of varying proportions in the starting mixtures, except that magnesia was used instead of lithia as the stabilizer and propan-2-ol was used, in the same proportions by mass, instead of water in the wet milling to dissolve the magnesia. Details of the mixtures are set forth in Table 4 as follows:

TABLE 4

| Sample | % by weight | | | mole ratio |
|---|---|---|---|---|
| | $K_2O$ | MgO | $Al_2O_3$ | $K_2O:MgO:Al_2O_3$ |
| 9 | 11.11 | 3.06 | 85.83 | 1:0.64:7.13 |
| 10 | 10.68 | 2.32 | 87.00 | 1:0.51:7.52 |
| 11 | 11.00 | 3.19 | 85.81 | 1:0.68:7.2 |

Figure 5:
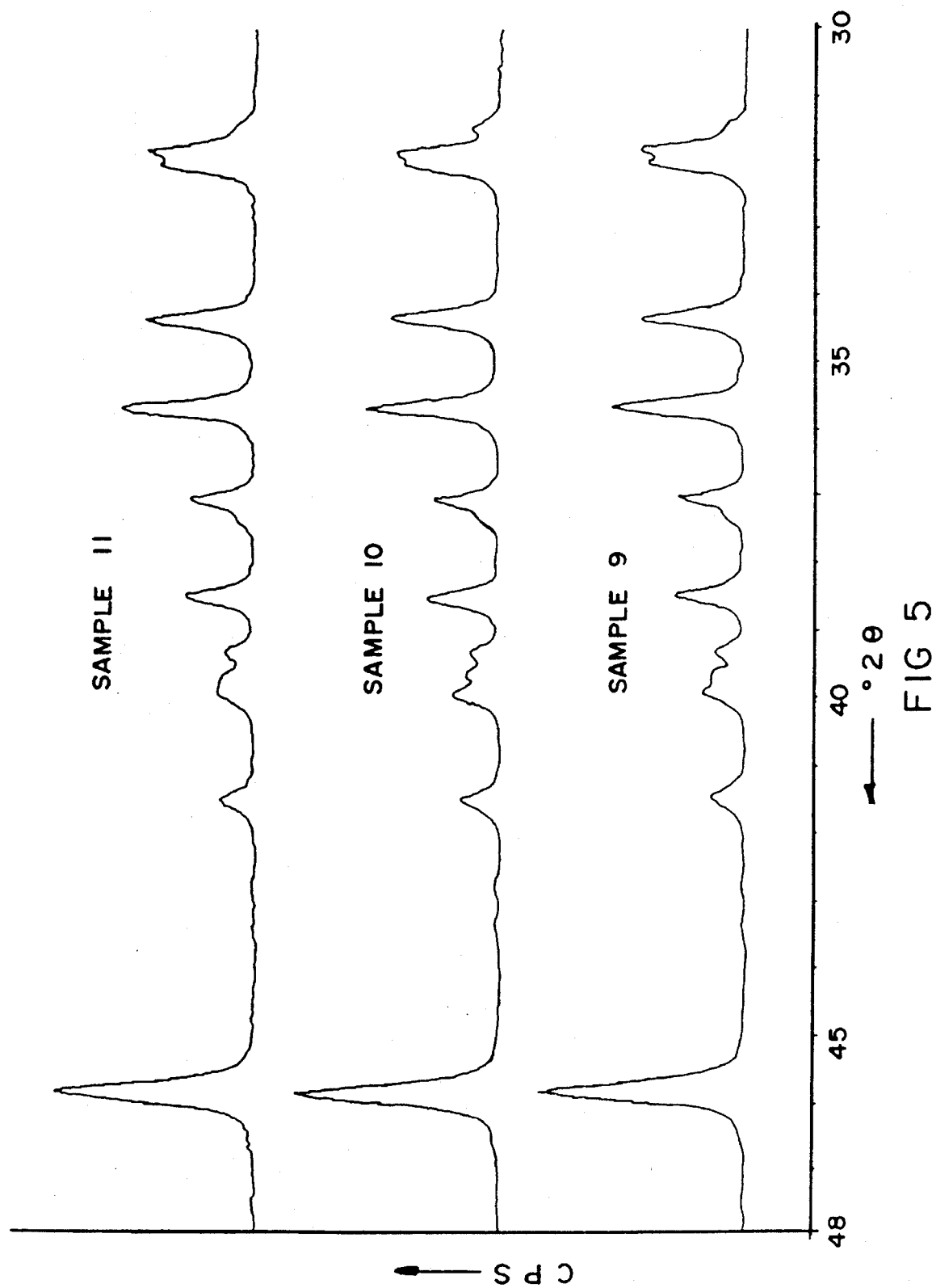
FIG. 5 shows plots of X-ray diffraction traces for samples 9–11 in counts per second (cps) against °2θ.

X-ray diffraction analysis results are shown in FIG. 5. These results show for each of Samples 9–11 a substantially single-phase product in the proportions used and for the $K_2O:Al_2O_3$ (boehmite) mole ratios in question.

EXAMPLE 5

Example 4 was repeated for the starting mixtures set forth in the following Table 5.

TABLE 5

| Sample | % by weight | | | mole ratio |
|---|---|---|---|---|
| | $K_2O$ | MgO | $Al_2O_3$ | $K_2O:MgO:Al_2O_3$ |
| 12 | 13.1 | 4.0 | 82.9 | 1:0.71:5.84 |
| 13 | 13.1 | 3.0 | 83.9 | 1:0.54:5.91 |
| 14 | 12.4 | 4.2 | 83.4 | 1:0.94:5.88 |

Figure 6:
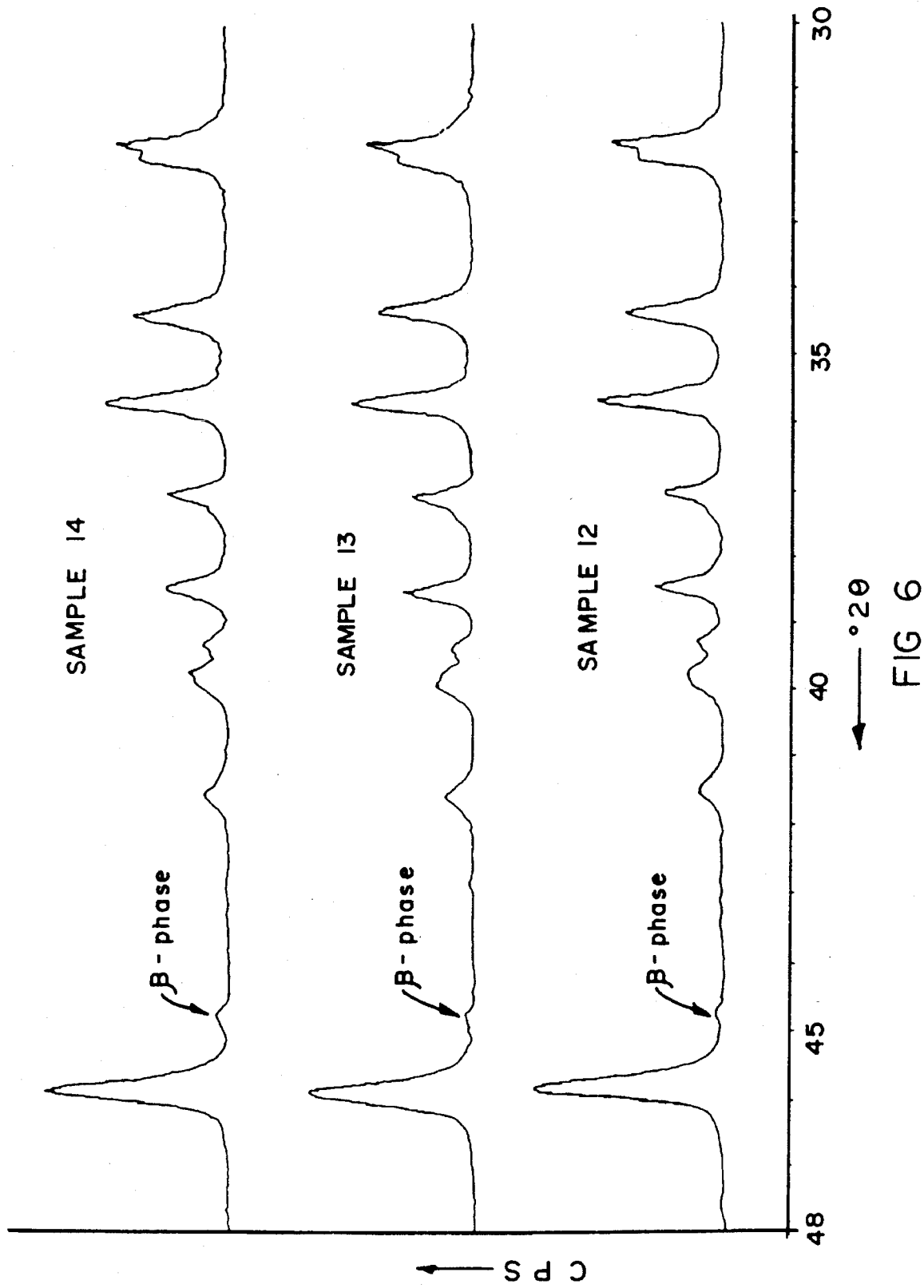
FIG. 6 shows plots of X-ray diffraction traces for samples 12–14 in counts per second (cps) against °2θ.

X-ray diffraction analysis results are shown in FIG. 6 from which it appears that, in addition to potassium β"-alumina, there is some potassium β-alumina present, which can be estimated from peak heights to be about 7% by mass of the product. These results indicate that the mole ratio of $K_2O:Al_2O_3$ should be less than 1:5 for the production of a single-phase product.

EXAMPLE 6

This Example tested analogues of β"-alumina in which part of the sodium in β"-alumina was replaced by potassium. Thus, a slip was prepared from boehmite and a solution of sodium hydroxide in deionized water milled for 6 hours in a Boultons VAE mill having α-alumina grinding media to an average particle size of 1–2 µ, and then spray dried in a spray drier having an inlet temperature of 170° C. and an outlet temperature of 60° C., the spray dried composition comprising a mixture whose proportions could be expressed (in terms of Na₂O and Al₂O₃) as 9% by mass Na₂O and 91% by mass Al₂O₃.

To 48,2 g of the spray dried composition was admixed 2 g of magnesia (BP grade of less than 5µ particle size) by wet milling in propan-2-ol (50% by mass solids) for 2 hours, to obtain a further slip. This further slip was divided into two portions, namely a smaller portion comprising ⅓ thereof and a larger portion comprising ⅔ thereof.

To the larger portion (Sample 15) were added 16 g of the dried mixture used for Sample 9 of Example 4, and to the smaller portion (Sample 16) were added 32 g of said dried mixture used for Sample 9, followed in each case by wet milling for 30 minutes after the addition of 1,5 g of propan-2-ol for every 1 g of dried mixture added. The milled slips were oven dried at 120° C. and then heated using a heating schedule of ambient-1100° C. at 5° C./min; 1100°–1600° C. at 40° C./min with a 20 minute hold at 1600° C.; and 1600° C.-ambient at 15° C./min.

Figure 7:
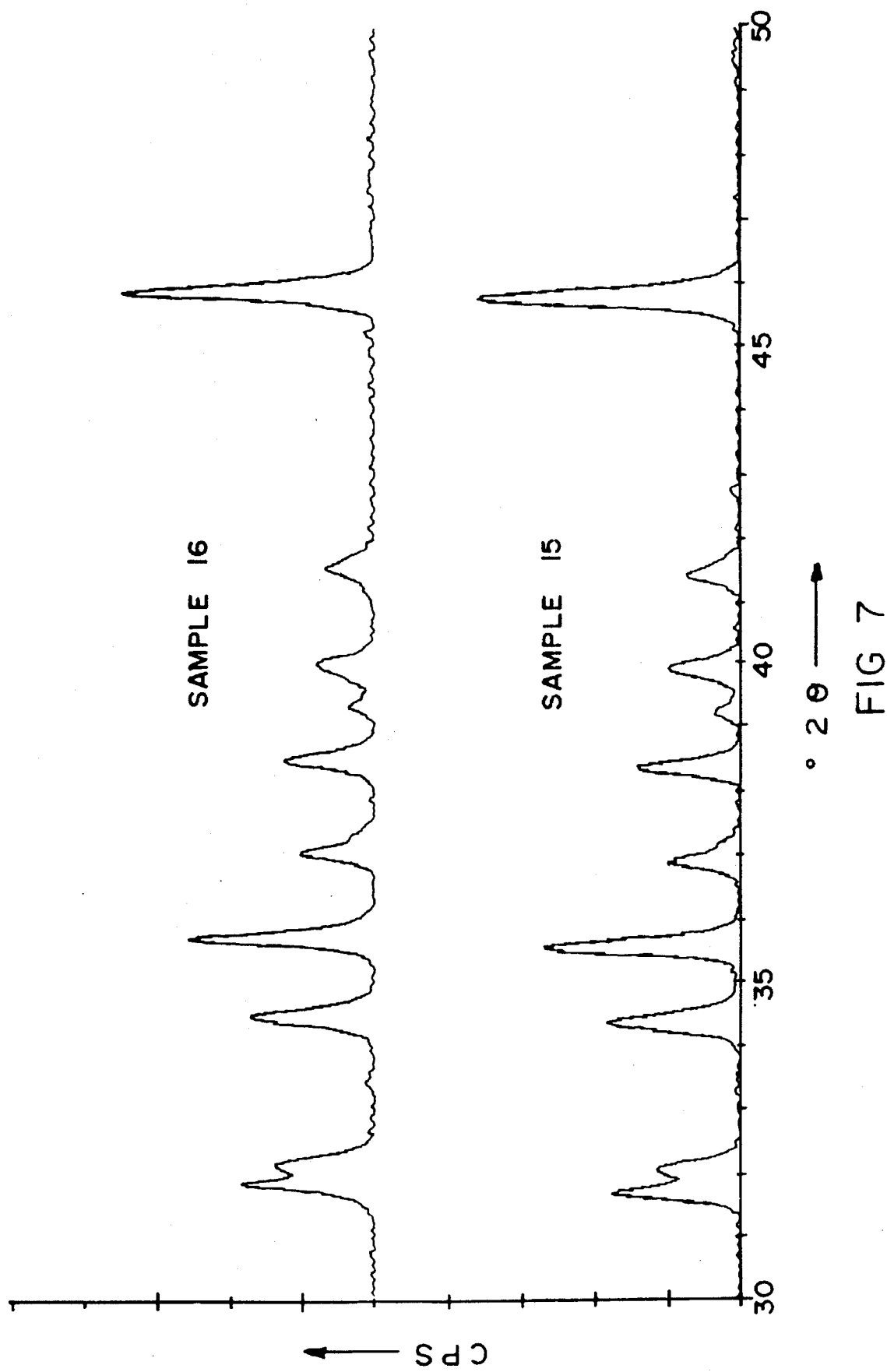
FIG. 7 shows plots of X-ray diffraction traces for samples 15 and 16 in counts per second (cps) against °2θ.

X-ray analysis of the products obtained are shown in FIG. 7. In each case no significant peaks were found for either sodium β-alumina or potassium β-alumina, and it appeared that in each case the combined sodium/potassium β"-alumina content was in excess of 95% by mass, ie the β"-alumina phase was more than 95% by mass with the β-phase being less than 5%. Sample 16 had a K₂O:Na₂O ratio (molar and by mass) 4 times greater than Sample 15.

This Example demonstrates that it is feasible to produce a mixed product comprising both sodium β"-alumina and potassium β"-alumina.

The aforegoing Examples indicate that it is feasible to make products which are essentially single-phase potassium β"-alumina or essentially single-phase sodium/potassium β"-alumina, when the starting materials are used in appropriate ratios. Potassium β"-alumina, ie the potassium analogue of sodium β"-alumina, can also be made as a phase in a multi-phase product comprising also α-alumina and/or potassium β-alumina.

These Examples have also shown that the conversion temperature for making potassium β"-alumina is less than 1240° C. (and from additional tests conducted by the Applicant it is believed to be about 1200° C.); and the Examples also show that the transition temperature above which potassium β"-alumina reverts to potassium β-alumina, is less than 1600° C.

Yet further tests have shown that sintering temperatures for the production of potassium β"-alumina or sodium/potassium β"-alumina artifacts, will be somewhat above 1600° C., in the range 1600°–1700° C., e.g. 1600°–1630° C. These tests and the Examples indicate that the transition is time-dependent and progresses relatively slowly, so that, at the rapid heating rates of up to 300° C./hr or more permitted by the method of the present invention, even with a slowing of the heating rate as the maximum temperature is approached, it is feasible to reach a suitable sintering temperature and to soak the artifact at that maximum temperature for a sufficient time to obtain an adequately strong and dense artifact, before an unacceptable proportion of the β"-alumina phase has reverted to the β-alumina phase.

Still further tests conducted by the Applicant have indicated that, for use as a solid electrolyte, it is desirable for both potassium β"-alumina and sodium/potassium β"-alumina to be prepared using magnesia as stabilizer, as the product appears to have a lower resistivity than when produced using no stabilizer.

I claim:

1. A method of making a sinterable solid electrolyte which is a conductor of alkali metal cations, the solid electrolyte having a layered β"-alumina spinal structure in which the alkali metal cations are present in discrete layers separated from one another by layers respectively comprising aluminum ions and oxygen ions, by dispersing, in aluminum oxide or a precursor thereof, an oxide of the alkali metal cations, or a precursor of said alkali metal cation oxide, to form a starting mixture, and heating the starting mixture to a conversion temperature above 1000° C., at which temperature at least some of the starting mixture is converted to said solid elecrolyte, wherein the alkali metal cations are selected from potassium cations and mixtures of potassium cations and sodium cations; and the aluminum oxide or precursor thereof is a boehmite selected to have an average crystallite size of at least 100 A, a basal plane spacing of at most 6.8 A, and a mass lose, upon heating at a rate of 10° C./min in air from 20° C. up to 700° C., of at most 20% by mass, with the maximum rate of mass loss occurring at a temperature of at least 400° C.

2. A method as claimed in claim 1, in which the boehmite has a said average crystallite size of at least 1000 Å, a said basal spacing of at most 6.5 Å and a said mass loss on heating of at most 17%, said maximum rate of mass loss occurring at a temperature of at least 500° C., the boehmite having a formula which can be expressed by Al₂O₃.mH₂O in which m is at most 1.05 and being hydrothermally prepared.

3. A method as claimed in claim 1, in which sodium oxide or a precursor thereof is dispersed in the boehmite, together with potassium oxide or a precursor thereof, to form the starting mixture.

4. A method as claimed in claim 5, in which potassium oxide is dispersed, without any sodium oxide in boehmite.

5. A method as claimed in claim 1, in which the mole ratio of said alkali metal cation oxide or its precursor, as the oxide, to the boehmite, is 1:2.875–1:30.

6. A method as claimed in claim 5, in which said mole ratio is 1:5– 1:13.

7. A method as claimed in claim 1, which includes dispersing in the boehmite, prior to the heating to the conversion temperature, magnesia as a spinel stabilizer, in a proportion of 0.25–5% by mass.

8. A method as claimed in claim 1, which includes the step, prior to forming the starting mixture, of calcining the boehmite by heating it in air to a temperature above 650° C. and below the conversion temperature.

9. A method as claimed in claim 8, in which the calcining is by heating to a temperature of 650°–750° C.

10. A method as claimed in claim 1, in which the heating of the starting mixture is to a temperature above 1200° C.

11. A method as claimed in claim 10, in which said temperature is 1550°–1700° C.

12. A method as claimed in claim 1, which includes dispersing in the boehmite prior to the heating to the conversion temperature, lithia as a spinel stabilizer in a proportion of 0.05–1% by mass.

13. A method as claimed in claim 11, in which said temperature is 1600°–1630° C., to make a sintered artifact which comprises β"-alumina.

14. A method as claimed in claim 6, in which said mole ratio is 1:5.575–1:10.

15. A method as claimed in claim 14, in which said mole ratio is 1:7–1:10.

16. A method as claimed in claim 15, in which said mole ratio is 1:8–1:10.

17. A method as claimed in claim 4, in which the heating of the starting mixture is to a temperature of 1500°–1700° C.

* * * * *

UNITED STATES PATENT AND TRADEMARK OFFICE
CERTIFICATE OF CORRECTION

PATENT NO. : 5,458,868
DATED : October 17, 1995
INVENTOR(S) : Peter Barrow

It is certified that error appears in the above-indentified patent and that said Letters Patent is hereby corrected as shown below:

In claim 1, column 14, line 7, delete "spinal" and insert --spinel-- therefor.

In claim 1, column 14, line 23, delete "lose" and insert --loss-- therefor.

In claim 4, column 14, line 39, delete "5" and insert --1-- therefor.

Throughout the patent, delete "C." and insert --C-- therefor, except in those locations where "C." denotes the end of a sentence.

Signed and Sealed this

Nineteenth Day of March, 1996

Attest:

BRUCE LEHMAN

Attesting Officer         Commissioner of Patents and Trademarks